United States Patent
Haland et al.

[11] Patent Number: 5,348,342
[45] Date of Patent: Sep. 20, 1994

[54] AIR BAG SYSTEM FOR SIDE COLLISION PROTECTION

[75] Inventors: Yngve Haland, Vargarda; Stig Pilhall, Trollhättan, both of Sweden

[73] Assignee: AB Volvo, Sweden

[21] Appl. No.: 40,919

[22] Filed: Mar. 31, 1993

[30] Foreign Application Priority Data

Apr. 10, 1992 [SE] Sweden .............. 9201154-3

[51] Int. Cl.⁵ .............................................. B60R 21/22
[52] U.S. Cl. .................................. 280/730 A; 180/274; 280/734
[58] Field of Search ............... 280/730 A, 730, 728 R, 280/735, 734; 180/274; 116/83, 78, 11, 15, 17, 203; 296/146 C, 189

[56] References Cited

U.S. PATENT DOCUMENTS

| | | | |
|---|---|---|---|
| 3,768,831 | 10/1973 | Wesselman et al. | |
| 4,706,990 | 11/1987 | Stevens | 280/734 |
| 4,934,751 | 6/1990 | Shimoda | 296/188 |
| 4,946,191 | 8/1990 | Putsch . | |
| 4,995,639 | 2/1991 | Breed | 180/274 |
| 5,074,583 | 12/1991 | Fujita et al. | 280/730 R |

FOREIGN PATENT DOCUMENTS

| | | | |
|---|---|---|---|
| 2816318 | 10/1978 | Fed. Rep. of Germany | 296/146 C |
| 2841729 | 4/1980 | Fed. Rep. of Germany | 280/730 R |
| 3-276843 | 12/1991 | Japan | 280/730 A |
| 2220620 | 1/1990 | United Kingdom . | |
| 2232936 | 1/1991 | United Kingdom . | |

*Primary Examiner*—Eric Culbreth
*Attorney, Agent, or Firm*—Lerner, David, Littenberg, Krumholz & Mentlik

[57] ABSTRACT

Apparatus for protecting vehicle occupants during side collision are disclosed, including at least one air bag mounted in a vehicle seat and a sensor for pyrotechnically initiating inflation of the air bag. The sensor is mounted on a frame connected to the vehicle body and on which the vehicle seat is mounted, and the vehicle body's sides and/or doors include compression load transfer plates for the direct transmission of energy to the sensor for bag inflation upon deformation of the corresponding side and/or door of the vehicle body.

5 Claims, 4 Drawing Sheets

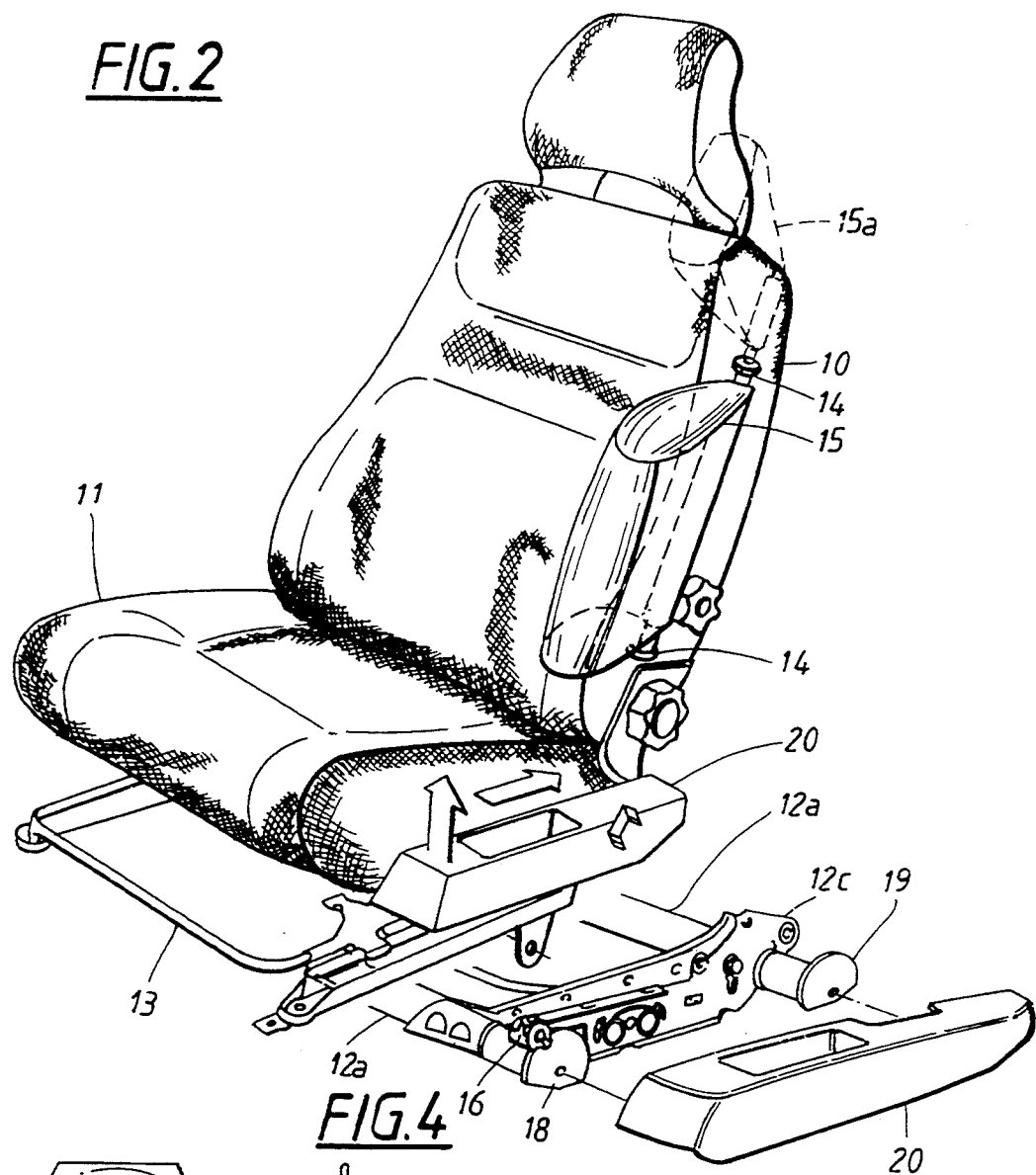
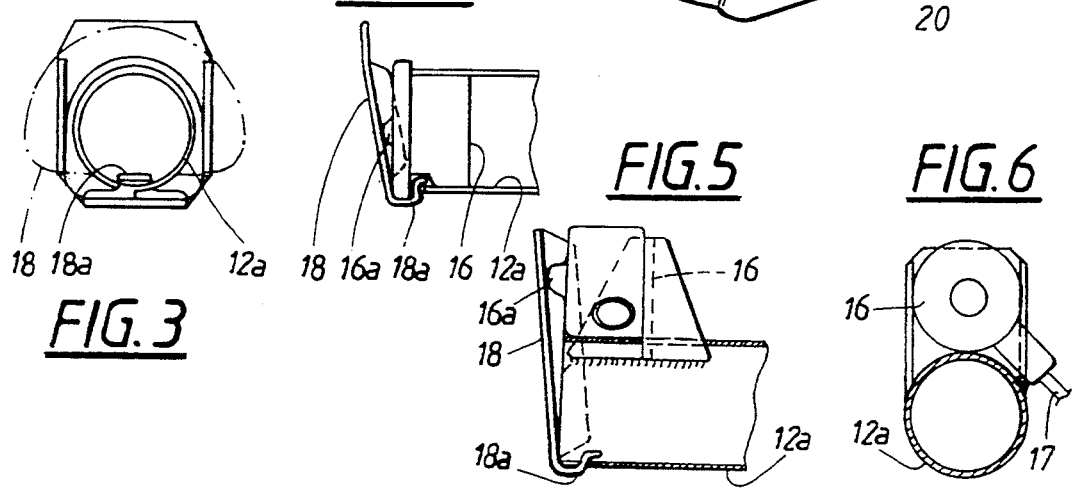

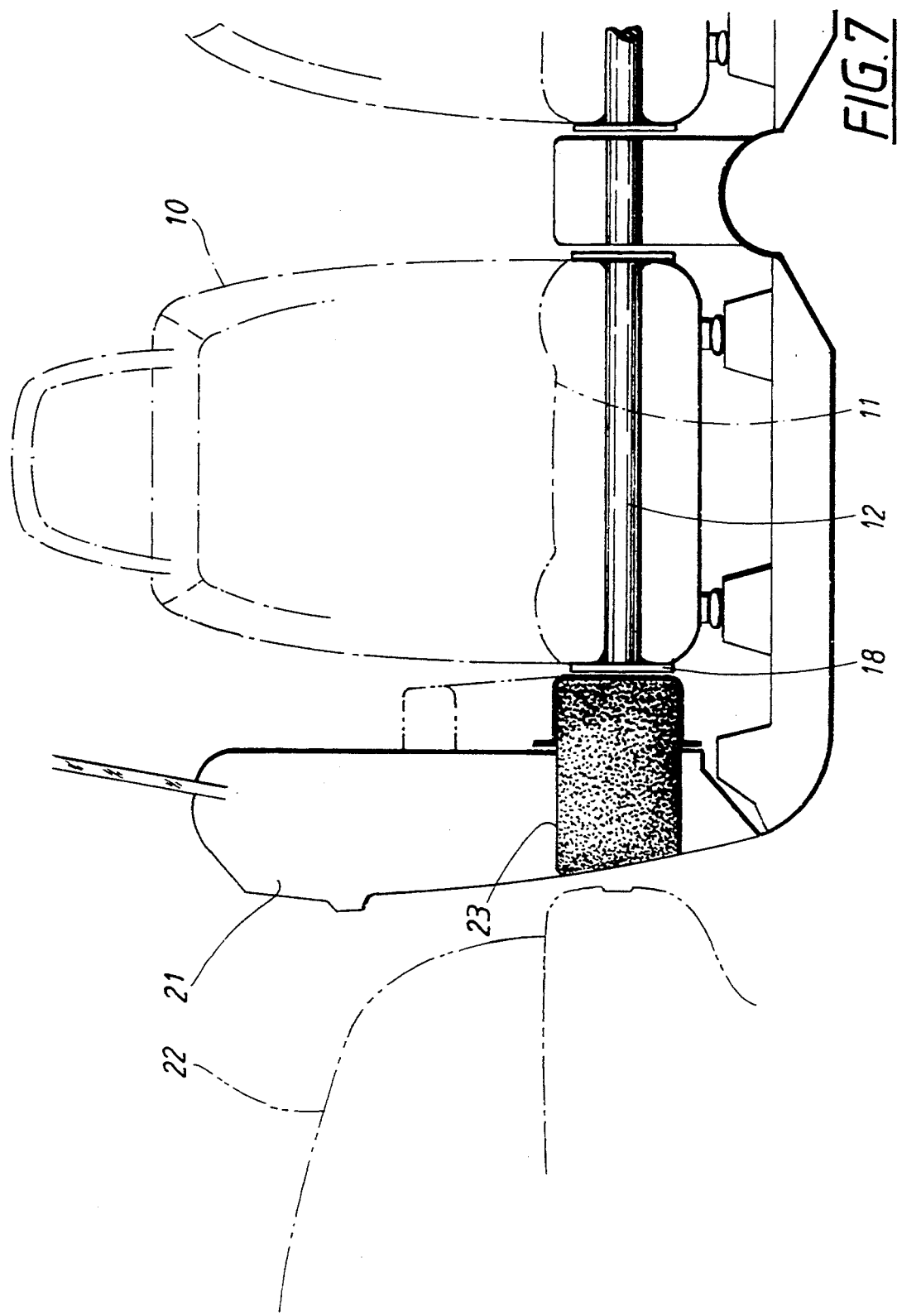

AIR BAG SYSTEM FOR SIDE COLLISION PROTECTION

FIELD OF THE INVENTION

The present invention relates to an arrangement for protecting vehicle occupants during side collisions, comprising at least one air bag mounted in a vehicle seat and a sensor for initiating pyrotechnic means for inflation of the bag.

BACKGROUND OF THE INVENTION

An automobile normally protects the passengers best during collisions from the front or the rear since the deformation paths and/or crumple zones are relatively long. It is therefore important that passenger protection during side collisions should be improved, such improvement occurring for example by the use of air or other gas-filled cushions which are more generally termed "air bags".

There are many known air bag systems designed to offer protection during side collisions, but none of these however offers a satisfactory solution to the problem of providing a adequately effective side collision protection system.

For instance, there are systems having the air bag placed in the door and which cooperate with an electronic sensor system. But these systems suffer from the disadvantage that it is difficult to achieve correct adjustment and adequate protection against damage. Furthermore a diagnosis system is required for regular control of the electrical system and the air bag has to be relatively large in order to cover all the possible adjustment positions of the vehicle seat, i.e with respect to the adjustability in the longitudinal and height directions and with respect to the back rest's inclination.

The document GB-A-2 255 535 shows a further arrangement whereby an air bag is placed in the door and connected with a pyrotechnic sensor system. This system is simpler since no electrical system is required, but otherwise presents the same disadvantages as in the aforementioned system which means that the door panel will be complicated and the compartment is more limited as regard the inclusion of strengthening members, beams etc.

GB-A-2 232 936 discloses an air bag in the vehicle seat with a sensor located in the door. The advantage with this system is that the bag is always located in the correct position with respect to the passenger, but the disadvantage is however that the signal transmission from the door to the adjustable seat is complicated and vulnerable.

SUMMARY OF THE INVENTION

An object of the present invention is therefore to achieve an effective and reliable air bag system for side collision protection.

This object is achieved according to the invention in that the sensor is mounted on a frame in the vehicle seat and connected to the vehicle body, and in that the sides and/or doors of the vehicle comprise compression load transfer means which extend to the respective sensor in such a way that the sensor can be triggered by a deformation of the corresponding side and/or door of the body.

Further advantageous embodiments of the invention will become apparent from the following description and figures of an exemplary embodiment.

BRIEF DESCRIPTION OF THE DRAWINGS

An embodiment of the invention will now be described in more detail with reference to the accompanying drawings, in which FIG. 2 is a perspective view of the seat of FIG. 1 with the attachment of the sensor shown in an exploded view, FIG. 3 and FIG. 4 show two views of an embodiment of the sensor's actuator, FIG. 5 and FIG. 6 show correspondingly a second embodiment of the sensor's actuator, FIG. 7 shows a schematic cross-sectional view through a vehicle body having a side collision protection system.

DETAILED DESCRIPTION OF PREFERRED EMBODIMENTS

Figure 1:
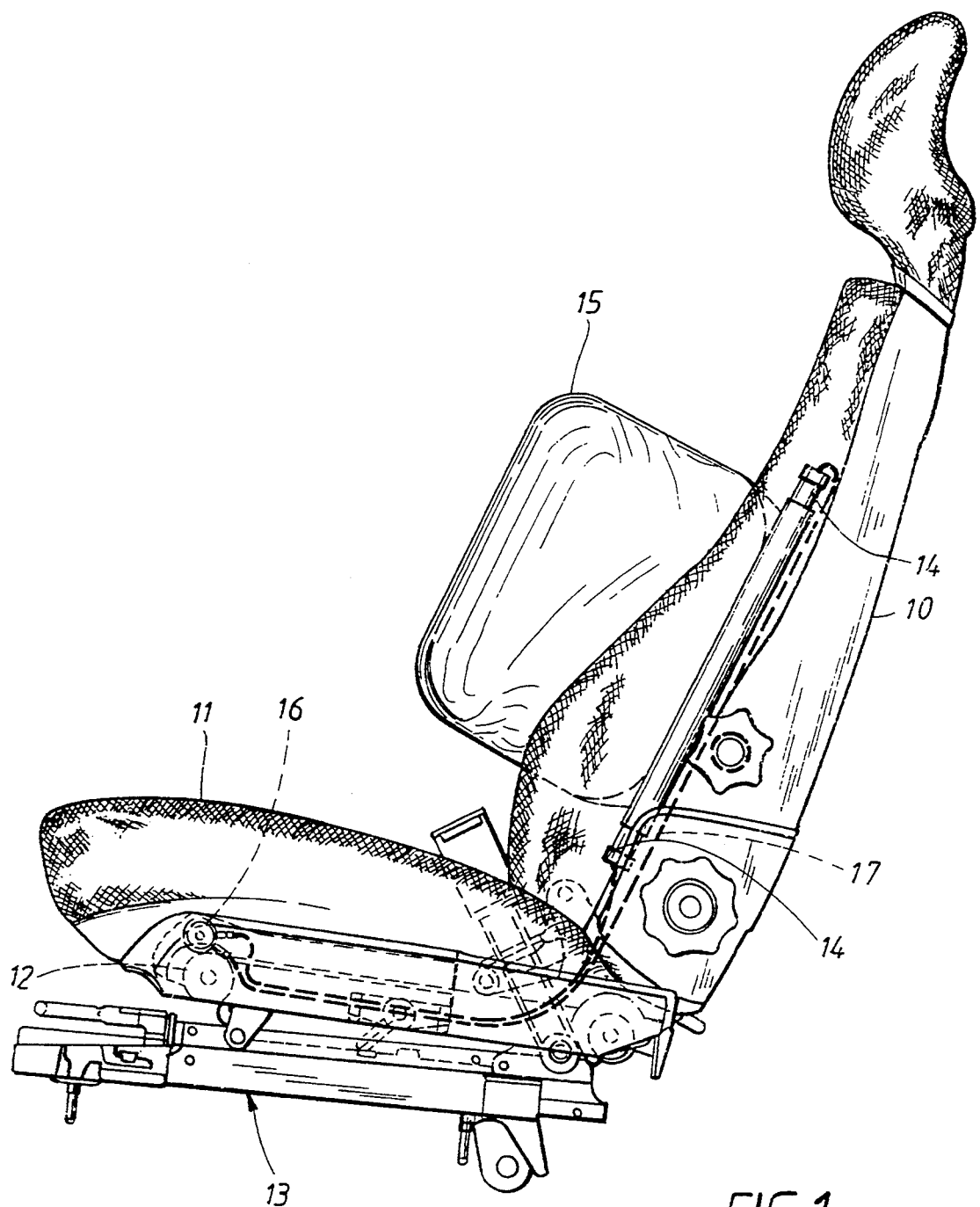
FIG. 1 is a view from the side, showing a vehicle seat with an air bag system according to the invention.

The vehicle seat shown in FIG. 1 comprises a back rest 10 which is adjustably connected to the seat cushion 11. The seat cushion 11 is provided with a strengthening inner frame 12 which is dimensioned to withstand side forces and which is mounted on a lower frame 13 allowing, in a manner known per se, the adjustability of the seat in the vehicle's lengthwise (longitudinal) direction and allowing possibly also the adjustability of the seat height. A tube with a gas generator 14 arranged at each end thereof is placed in the outer side of the back rest 10 and cooperates with an inflatable air bag 15 (or other gas-inflatable cushion or bag) which is shown in an inflated condition in FIG. 1 and 2. The non-inflated bag 15 is normally packed into the seat in a position adjacent to the gas generator and behind an openable seam in the upholstery fabric. Both ends of the gas generator 14 are connected with a pyrotechnic sensor 16 via NONEL Pyrotechnic lines 17 which are internally "powdered" with highly explosive material. On actuation of the sensor 16, a pyrotechnic flame propagates through the line 17 with a speed of about 2,000 m/sec. When this flame reaches the gas generator 14, the bag 15 will be inflated in a few ten-thousandths of a second.

FIG. 2 shows the seat 10, 11 with lower frame 13 and the frame 12 which takes up side forces and which comprises two lateral tubes 12a. These extend through a connection piece 12c and project outwardly from the outer side of the seat like two impact bumpers (impact fenders) with a front and a back end piece 18 and 19 respectively. These two side impact bumpers are contained within a panel 20 which in the lateral direction closes tightly against the end pieces 18 and 19. The front end piece 18 is always located in the area of the side door irrespective of the seat's adjustment, said side door being a structural part which is more easily deformable than the door pillar positioned close by.

FIGS. 3 to 6 show two variations of the end pieces 18 in end view and side view. In the embodiment according to FIGS. 3 and 4, the sensor 16 is placed inside the end of the tube 12a. The sensor's abutment stud 16a projects outwardly a small distance from the end of the tube and can be operated by end piece 18 which is pivotally connected with the end of the tube via an S-formed portion 18a.

In the embodiment of FIG. 5 and 6 the sensor 16 is placed above the end 12a of the tube. The sensor's abutment stud 16a projects somewhat above the end of the tube and can be operated by an end piece 18 which, as in the foregoing embodiment, is pivotally connected with the end of the tube via an S-formed part 18a. Due to the fact that the arrangement of the end piece 18 is such that it has a significant extension in a plane extending crosswise and, to a greater extent, perpendicular with respect to the sensor's abutment stud 16a, a widened field of operation is obtained.

FIG. 7 shows a schematic view of one example of how the vehicle's door 21 can be formed in order to transfer the deformation forces from a vehicle 22 coming in from the side, through the door via a cellular plastic block 23 to the end piece 18 and the sensors 16 mounted in the seat's stable tube frame 12.

Figure 8:
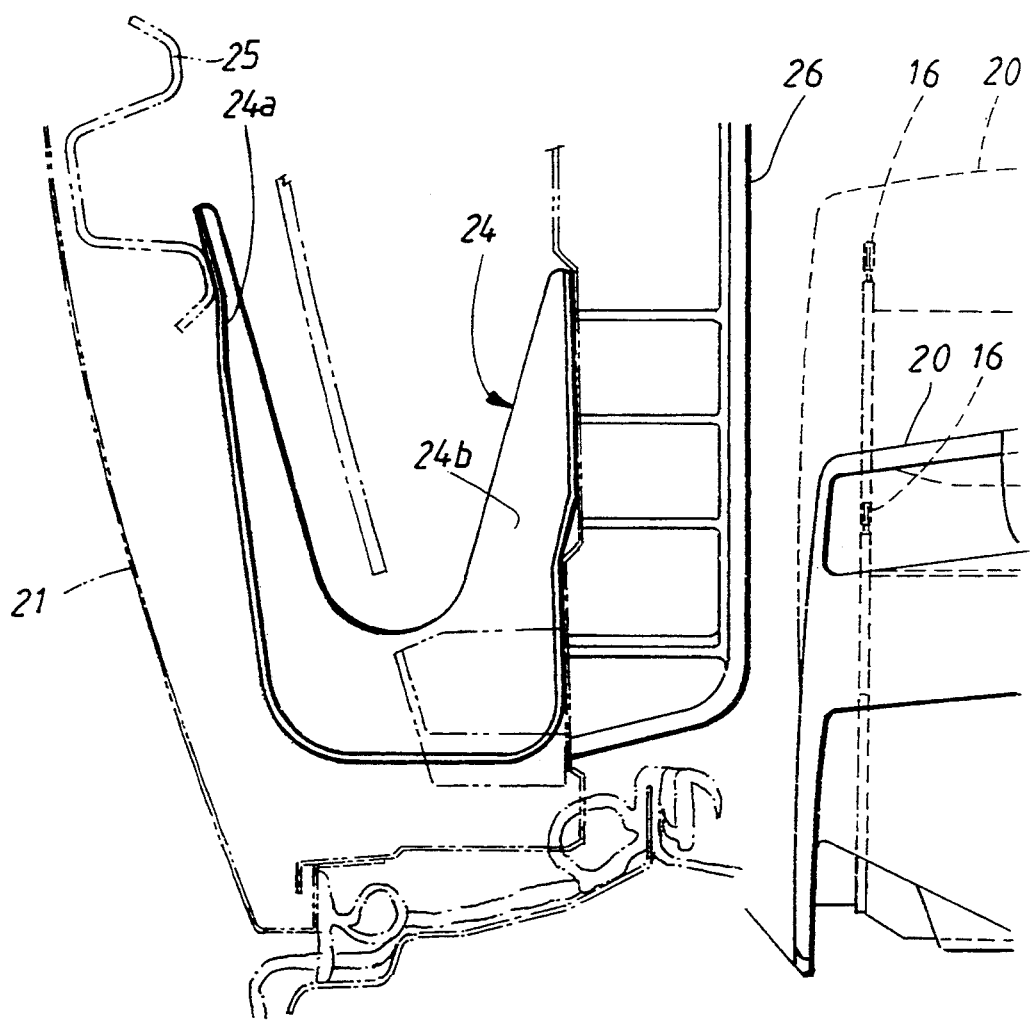
FIG. 8 shows, in more detail, an alternative design of the door's compression load transferring means.

The collision force from the colliding vehicle is lead quickly through the door via the stiff cellular plastic block 23 and the door panel to the sensor in the seat frame. The door can alternatively be equipped with an inner plate or sheet structure 24 as shown in FIG. 8. The plate structure comprises longitudinal and lateral plates 24a and 24b respectively in the door interior, said plates bridging the space between the strengthening member 25 in the door and a door panel 26 mounted on the inside of the door (with respect to the vehicle). The panel 26 presents similarly an inner structure which transmits the deformation forces in turn to the sensor 16 in the seat panel 20. FIG. 8 shows the seat panel 20 and the sensor 16 in solid lines in its lowest position of adjustment and with dashed lines in its highest position of adjustment.

The extent of coverage provided by the compression load transferring means 23 and 24 in the door 21 must be sufficiently large in order to at least cover the sensor over the whole range of adjustment of the seat.

The sensor 16 reacts only when two conditions are fulfilled, namely that the abutment force has to exceed a certain value (e.g. 500N) and that the process must occur with a certain speed (e.g. 3 m/sec).

The transfer of the ignition pulse from the sensor to the gas generator can occur via one or several pyrotechnic lines (or tubes), depending on the design of the gas generator.

An extra air bag can also be used, above the one shown, in order to protect the passenger's head. An example of such an air bag has been indicated in FIG. 2 in dashed lines. This air bag 15a is activated by the same sensor 16 and can be inflated by the upper of the two gas generators 14.

The risk of accidental actuation is extraordinarily low since the door has to be deformed substantially before the sensor is affected. Thus, for example, someone kicking the vehicle door would not actuate the sensor.

The invention is not limited to the above described embodiments, but can be varied considerably within the scope defined by the following claims.

What is claimed is:

1. Apparatus for protecting occupants of a vehicle during side collisions, said vehicle having a vehicle body including sides and at least one adjustable vehicle seat including a frame mounted on said vehicle body, said apparatus comprising at least one air bag mounted in said vehicle seat, sensor means for initiating inflation of said at least one air bag, said sensor means mounted on said vehicle seat frame, and compression load transfer means mounted between at least one side of said vehicle body and said sensor means whereby deformation of said vehicle side causes activation of said sensor means by a direct transfer of energy through said compression load transfer means, said adjustable vehicle seat being adjustable within a predetermined range of adjustment, and said compression load transfer means having an extent of coverage corresponding at least to said predetermined range of adjustment of said adjustable vehicle seat.

2. The apparatus of claim 1 wherein said compression load transfer means includes a first compression load transfer member located in a door associated with said at least one side of said vehicle, and a second compression load transfer member comprising an actuator member for actuating said sensor means associated with said adjustable vehicle seat, said first and second compression load transfer members being closely juxtaposed with each other.

3. The apparatus of claim 1 including a gas generator connected to said at least one air bag, said sensor means comprising pyrotechnic sensor means, and including at least one pyrotechnic line connecting said sensor means to said gas generator.

4. The apparatus of claim 1 including actuator means for actuation of said sensor means, said actuator means including an actuator member extending substantially parallel to said sensor means, and a pivotable support plate supporting said actuator member, said pivotable support plate extending in a plane substantially perpendicular to said actuator member.

5. The apparatus of claim 1 wherein said vehicle body side includes a door having an outer surface, a reinforcing beam within said door and an inner side including a door panel spaced from said reinforcing beam, said compression load transfer means including plate means including longitudinal and lateral plate members in said door interior bridging said space between said reinforcing beam and said door panel.

* * * * *